United States Patent Office 3,050,493
Patented Aug. 21, 1962

3,050,493
DRY EPOXY RESIN ADHESIVE COMPOSITION
AND PROCESS FOR PREPARING SAME
Herman B. Wagner, Blooming Glen, Pa., and Ernest E. Weller, Sayreville, N.J., assignors to Tile Council of America, Inc., New York, N.Y., a corporation of New York
No Drawing. Filed July 28, 1959, Ser. No. 829,962
10 Claims. (Cl. 260—37)

The present invention relates to dry adhesive compositions which are made functional by the addition of a liquid thereto. More particularly the present invention relates to dry compositions comprising epoxide resins, amine hardener salts and pH adjusters, which are caused to be functional by the addition of a liquid thereto.

The usefulness of epoxide resin adhesives is universally recognized. The applications in which these resins are used are literally too numerous to mention. Despite the universal acceptance of epoxide resin polymers as bonding agents and the like it is recognized in conventional practice with these polymers that they present numerous problems of handling which are accepted as necessary to the use thereof, this use being made because of the extraordinary qualities of the product in spite of the awkwardness with which they are used.

Epoxide resin polymers are formed by bringing together an epoxide resin monomer or prepolymer and a liquid amine hardener. The two basic components are mixed intimately and the cross-linking and polymerization takes place which results in a product which sets to an extremely high bond strength and a chemical resistant polymer. The amine hardener is usually a diamine or a polyamine. These amines have been recognized to be especially well suited to cross-linking with such polymers because of their very high reactivity even at room temperature.

In addition to the disadvantage of multiple packaging in order to insure against premature contact of the epoxide resin with the amine hardener there are other objections connected with epoxide amine systems in that some free diamines and polyamines are volatile substances with irritating and allergenic actions. The two essential components must be mixed in reasonably accurate proportions in order to obtain maximum cross-linking of the polymer. The homogeneous mixing of the liquid-liquid systems of amine and epoxide resin polymer is difficult to achieve since the reaction is rapid and any pockets of reaction product tend to block out other portions of the as yet unreacted ingredients.

The present invention avoids these disadvantages and provides a unitary dry adhesive composition which may be made functional and ready for use by the addition of a liquid vehicle which serves the dual function of activating the polymerization reaction and giving fluidity to the dry pulverulent composition.

The present invention comprises bringing together in dry pulverulent form the following substances:

An epoxide-type polymer or prepolymer, polyamine in ammonium salt form, a strong base, and at the time of use a liquid, such as water, ethyl alcohol, and mixtures of the foregoing to initiate the polymerization.

The mechanism and sequence of events which take place when the liquid is added to the dry composition are believed to be as follows:

Liquid+base+ammonium form of amine gives:
  (a) Solution of base +solution of ammonium form of amine.
  (b) Solution of base + solution of ammonium form of amine gives a free amine +water.
  (c) Free amine +epoxide compound gives epoxide polymer.

In step (a) the addition of sufficient liquid transforms the dry powdery mixture to a fluid form as well as dissolving the base and the ammonium form of the amine. The solution of these two products causes them to react according to step (b) to yield the free amine. Finally the free amine reacts with the epoxide monomer or prepolymer as shown in step (c) forming the cross-linked epoxide polymer. We do not wish to restrict ourselves to the mechanism set forth above, but it is believed to be the probable description of the chemical process involved.

The use of silica aerogel and finely divided sand in combination as carrier and aggregate for the components of the present invention serves two purposes. They insure the availability of a great surface on which the cross-linking of the epoxide resins and the amine hardeners will take place. The sand moderates the speed of reaction by taking up a considerable amount of the exothermal heat produced by the initial solution of some of the components and the heat produced during the cross-linking of the amine and epoxide resin. When the balance is changed in favor of greater amounts of aerogel the curing rate is increased due to the greater amount of heat available to the reaction but shrinkage of the composition is increased also. A balance between rate of curing and ultimate shrinkage may be obtained by varying the amounts of filler in the form of aggregate and carrier which are included in the dry compositions.

Liquid epoxide resins and liquid amine hardeners in salt form through adsorption on the aerogel and sand are made substantially dry and can be contacted with each other without initiating any appreciable degree of polymerization. The mixtures are relatively uniform and therefore may be prepared in such manner that any portion may be removed from the whole and still retain substantially the proportion of epoxide resin and amine hardener which were originally determined to be most suitable for the particular ingredients used in making up the dry composition.

Compositions of the type described will, if exposed to unduly great amounts of water, partially react but this quality is not such that it would be proper to characterize the compositions as water-sensitive. Their sensitivity to water in the form of humidity or other vapor lies between Portland cement and calcium chloride. The compositions therefore may be shipped in plastic-lined paper bags and the like without other special precautions being necessary.

Specific examples embodying the teachings set forth above are here given by way of exemplification and not restriction.

Example I

The hydrochloric acid salt of diethylene triamine was prepared by mixing 129 weight parts of 37% hydrochloric acid with 45 weight parts of diethylene triamine, dissolved in 200 weight parts of water. The water was evaporated from this solution by drying at 110° C. and a crystalline salt residue obtained.

100 weight parts of a liquid epoxide resin were mixed with 233 parts of a fine, 100 mesh, silica sand and 40 parts of silicon dioxide aerogel. The epoxide resin was of the epichlorohydrin-bisphenol of acetone type, having a viscosity of about 22,000 centipoises (25° C.), an epoxide equivalent of approximately 200, and a melting point in the range of 8 to 12° C. Its structural formula is represented as:

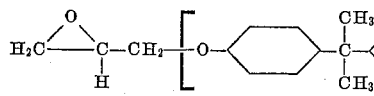 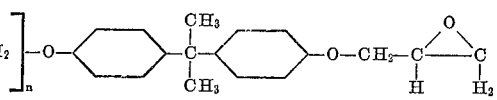

The silicon dioxide aerogel had a particle size in the range of 0.5 to 3.0 microns and a specific surface area of about 200 square meters/gram. The function of the addition of the sand which may have a particle size between 16 and 300 mesh and silicon dioxide aerogel is that of converting the liquid polymer into the form of free-flowing powder.

The following powder mixture was prepared:

15 weight parts of the acid salt prepared above
373 weight parts of the resin powder prepared above
8.4 weight parts of powdered sodium hydroxide This composition yielded a free-flowing powder, remarkably stable upon long-term storage, even though comprising acidic and basic constituents in intimate contact with one another. When 92 weight parts of water were added to this powder a fluid, coherent mix was obtained. This was troweled onto a concrete floor surface, at a thickness of approximately 3/32″ and used as a setting-bed (adhesive) for ceramic tile. After a period of 24 hours the material had hardened and a strong bond developed to the concrete surface and the underside of the tile.

*Example II*

The hydrochloric acid salt of N-octadecene trimethylene diamine was prepared by reaction of 42 weight parts of 37% hydrochloric acid with 84.4 weight parts of the diamine. The N-oleic trimethylene diamine is prepared by the reaction of octadecyl amine, derived from oleic acid, with acrylonitrile and subsequently hydrogenating this product. Its structural formula is represented as follows:

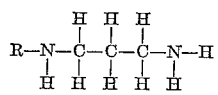

where R indicates a C$_{18}$ alkyl grouping. 15 weight parts of the aerogel described above were then mixed into this salt to produce a free-flowing powder.

In order to produce a more finely divided resin powder 21.4 weight parts of the liquid epoxide resin described in Example I were dissolved in an equal weight of ethyl alcohol and into this 8.6 weight parts of aerogel and 70 parts of fine white silica sand were mixed. The alcohol was then evaporated from this slurry, yielding a colorless, free-flowing powder.

The following powder mixture was prepared:

62.3 weight parts of the acid salt
36.3 weight parts of the resin powder
1.4 weight parts of sodium hydroxide This composition yielded a fine, free-flowing powder, which subsequently required 16.5% of its total weight of water to give a fluid composition. This composition was used as a jointing compound, placed between the edges of floor tile. Exceptional ease in cleaning excess material from the tile faces was noted and a hard, chemically resistant surface was obtained.

*Example III*

A composition similar to that described in Example II was prepared, but using N-octadecadiene trimethylene diamine. Comparable properties were obtained.

*Example IV*

A composition similar to that described in Example II was prepared but with the chloride salt of Example II replaced by the acetic acid salt. Comparable properties were obtained.

*Example V*

A composition similar to that described in Example III was prepared but with the chloride salt replaced by the phosphoric acid salt. This functioned similarly.

*Example VI*

A composition similar to that described in Example I was prepared, but employing the hydrochloric acid salt of triethylene tetramine as the form of amine.

*Example VII*

The following composition (based on weight):

11.2% hydrochloric acid salt of N-octadecene trimethylene diamine
7.7% silicon dioxide aerogel
63.0% fine sand
15.0% epoxide resin
3.1% powdered sodium hydroxide when mixed with 16.2% of its weight of water gave a fluid composition, suitable for use as a chemically resistant setting bed or jointing compound. This material showing relatively early development of hardness, and is especially suitable where early service of a ceramic tiled floor is required. The epoxide resin referred to in this example was of the polyfunctional type, corresponding to the following structural formula:

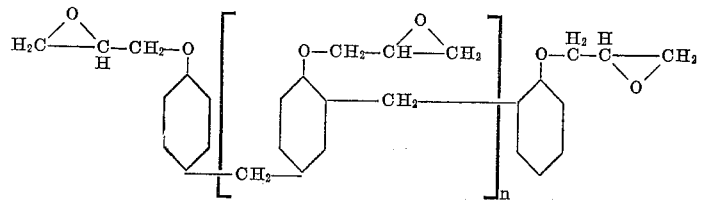

where *n* is a number such that the resin contains one gram-mole of the epoxide group per 180 to 200 grams of resin.

*Example VIII*

The following composition (based on weight):

19.5% epoxide resin of Example I
8.0% titanium dioxide
9.7% silicon dioxide aerogel
18.3% hydrochloric acid salt of N-octadecadiene diamine
40.0% wollastonite (300 mesh)
4.5% powdered sodium hydroxide when mixed with 28% of its weight of water gave a creamy, non-granular, white, fluid composition suitable for use as a jointing compound where a smooth, white joint surface is required. The function of the titanium dioxide pigment is that of imparting whiteness and hiding power, while the wollastonite filler acts as a finer sized and softer substitute for the sand.

*Example IX*

100 weight parts powdered composition of Example VII were mixed with 20 weight parts of ethyl alcohol to give a smooth, fluid mix, suitable for use as a ceramic tile adhesive. This composition, while requiring a longer period for development of ultimate strength, gives a more rapid initial set, when applied over porous backup materials.

*Example X*

The 3.1% of sodium hydroxide utilized in Example VII was replaced by 4.2% of potassium hydroxide and 100 parts of this powdered composition were mixed with 18 weight parts of ethyl alcohol. This composition performed comparably to that of Example IX.

Due to their greater availability commercially produced polyfunctional amines may be used in their acid salt forms in this invention with equal success to that obtained using pure amines. Examples of such commercially available amines are those obtained from the Chemical Division of Armour & Company under the trade names "Duomeen O" and "Duomeen S." "Duomeen O" consists essentially of a mixture of N-alkyl trimethylene diamines derived from technical grade oleic acid. The alkyl group content is distributed as follows:

| | Percent |
|---|---|
| C-14 | 2 |
| C-16 | 5 |
| C-18 | 93 |

"Duomeen S" consists essentially of a mixture of N-alkyl trimethylene diamines derived from soya acids. The alkyl group content is distributed approximately as follows:

| | Percent |
|---|---|
| C-16 | 13 |
| C-18 | 87 |

*Example XI*

The following composition (based on weight):

6.2% hydrochloric salt of "Duomeen O"
8.4% epoxide resin of Example I
4.2% silicon dioxide aerogel
1.3% powdered sodium hydroxide
79.9% fine sand mixed with 16% of its weight by water gave a smooth, viscous paste composition which developed a strong resistant bond to ceramic tiles which was substantially set at the end of 24 hours.

*Example XII*

The following composition (based on weight):

6.2% hydrochloric salt of "Duomeen S"
7.5% epoxide resin of Example I
3.2% silicon dioxide aerogel
3.0% powdered sodium hydroxide
80.1% fine sand mixed with 15% of its weight by water resulted in an excellent setting and grouting composition for tiles which showed a minimum of contraction upon hardening.

The invention in its broader aspects is not limited to the specific steps, methods, compositions and improvements shown and described herein, but departures maybe made within the scope of the accompanying claims without departing from the principles of the invention and without sacrificing its chief advantages.

What is claimed is:

1. A dry bonding composition adapted to become functional upon the addition of a liquid selected from the group consisting of water, ethyl alcohol, and mixtures of the foregoing, which comprises: a liquid epoxy resin which is selected from the group consisting of the reaction product of epichlorohydrin with bisphenol, and epoxy resins having the following structural formula:

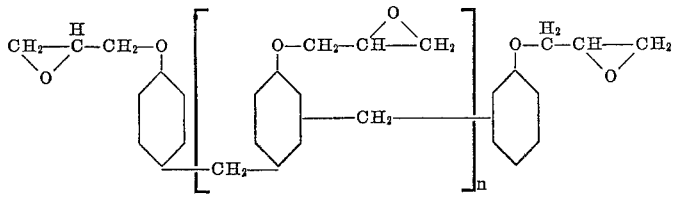

where $n$ is a number such that the epoxy resin contains one gram-mole of the epoxide group per 180 to 200 grams of resin; the liquid epoxy resin being adsorbed on a finely divided, solid inert carrier; and, as the epoxy resin hardener, an acid salt of an amino compound containing at least two amino groups; and a strong base in powdered form.

2. The dry bonding composition of claim 1 wherein the finely divided, solid carrier is a member selected from the group consisting of silicon dioxide aerogel, sand, and mixtures of the foregoing.

3. The dry bonding composition of claim 1 wherein the finely divided, solid carrier is a member selected from the group consisting of silicon dioxide aerogel having a particle size of between about 0.5 and 3.0 microns, sand having a particle size of between 16 and 300 mesh, and mixtures of the foregoing.

4. The dry bonding composition of claim 3 wherein the acid salt is an acid salt of a member selected from the group consisting of diethylene triamine, N-oleic trimethylene diamine, triethylene tetramine, N-octadecadiene trimethylene diamine, N-octadecene trimethylene diamine, and N-alkyl trimethylene diamines in which the alkyl group contains 14 to 18 carbon atoms.

5. A method of preparing a dry bonding composition adapted to become functional upon the addition of a liquid selected from the group consisting of water, ethyl alcohol, and mixtures of the foregoing, which comprises: adsorbing on a finely divided inert solid carrier a liquid epoxy resin which is a member selected from the group consisting of the reaction products of epichlorohydrin with bisphenol, and epoxy resins having the following structural formula:

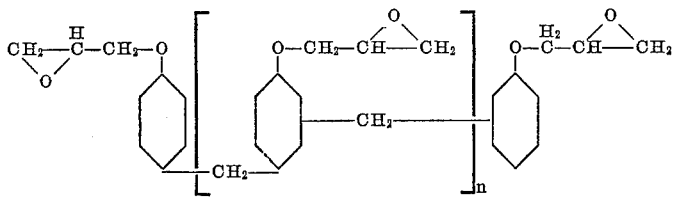

where $n$ is a number such that the epoxy resin contains one gram-mole of the epoxide group per 180 to 200 grams of resin; and admixing therewith, as an epoxy resin hardener, an acid salt of an amino compound containing at least two amino groups; and a strong base in powdered form.

6. The method of claim 5 wherein the acid salt of the amino compound is in liquid form and is also adsorbed on the inert, finely divided solid carrier.

7. The method of claim 5 wherein the inert, finely divided carrier is a member selected from the group consisting of silicon dioxide aerogel, sand, and mixtures of the foregoing.

8. The method of claim 5 wherein the acid salt is an acid salt of a member selected from the group consisting of diethylene triamine, N-octadecadiene, trimethylene diamine, N-octadecene trimethylene diamine, triethylene tetramine, N-oleic trimethylene diamine, and N-alkyl trimethylene diamines in which the alkyl group contains 14 to 18 carbon atoms.

9. The method of claim 5 wherein the finely divided solid carrier is a member selected from the group consisting of silicon dioxide aerogel, having a particle size of between about 0.5 and 3.0 microns, sand having a particle size of between 16 and 300 mesh, and mixtures of the foregoing.

10. The dry bonding composition of claim 1 wherein the acid salt of the amino compound is in liquid form and is also adsorbed on an inert, finely divided solid carrier.

References Cited in the file of this patent

UNITED STATES PATENTS

| | | |
|---|---|---|
| 2,772,248 | Lieberman et al. | Nov. 27, 1956 |
| 2,909,448 | Schroeder | Oct. 20, 1959 |

OTHER REFERENCES

Lee et al.: "Epoxy Resins," McGraw-Hill, New York (1957), pages 151 and 215.

Delmonte: "The Technology of Adhesives," Reinhold Pub. Corp., New York (1947), pages 477–478.